US012529207B2

(12) United States Patent
Kitahara

(10) Patent No.: US 12,529,207 B2
(45) Date of Patent: Jan. 20, 2026

(54) ELECTRIC WORK MACHINE

(71) Applicant: Yanmar Holdings Co., Ltd., Osaka (JP)

(72) Inventor: Satoshi Kitahara, Fukuoka (JP)

(73) Assignee: Yanmar Holdings Co., Ltd., Osaka (JP)

(*) Notice: Subject to any disclaimer, the term of this patent is extended or adjusted under 35 U.S.C. 154(b) by 284 days.

(21) Appl. No.: 18/387,036

(22) Filed: Nov. 5, 2023

(65) Prior Publication Data

US 2024/0175238 A1   May 30, 2024

(30) Foreign Application Priority Data

Nov. 30, 2022   (JP) .................... 2022-191003

(51) Int. Cl.
*E02F 9/08* (2006.01)
*B60L 58/26* (2019.01)

(52) U.S. Cl.
CPC ............ *E02F 9/0866* (2013.01); *B60L 58/26* (2019.02); *B60L 2200/40* (2013.01)

(58) Field of Classification Search
CPC ..... E02F 9/0866; B60L 58/26; B60L 2200/40
See application file for complete search history.

(56) References Cited

U.S. PATENT DOCUMENTS

| 8,196,555 B2* | 6/2012 | Ikeda ................... E02F 9/0866 123/41.49 |
| 2019/0126184 A1* | 5/2019 | Kennedy ................ B01D 46/71 |
| 2020/0248614 A1* | 8/2020 | Sakaray .................. F01P 11/08 |

FOREIGN PATENT DOCUMENTS

JP   2021080708 A   *   5/2021

* cited by examiner

*Primary Examiner* — Edwin A Young
(74) *Attorney, Agent, or Firm* — Chris Mizumoto

(57) ABSTRACT

A hydraulic excavator as an electric work machine includes a plurality of electric devices, a first heat exchanger that cools a refrigerant passing through at least one of the plurality of electric devices, a hydraulic pump that is driven by any one of the plurality of electric devices and discharges hydraulic oil, a second heat exchanger that cools the hydraulic oil, and a fan that takes outside air into an interior of a machine body. The first heat exchanger is arranged on an upstream side of the fan in a flow direction of the outside air flown by the fan, and the second heat exchanger is arranged on a downstream side of the fan in the flow direction of the outside air.

10 Claims, 9 Drawing Sheets

ELECTRIC WORK MACHINE

CROSS-REFERENCE

This application claims foreign priority of JP2022-191003 filed Nov. 30, 2022, the disclosures of which are hereby incorporated by reference in their entirety.

TECHNICAL FIELD

The present invention relates to an electric work machine.

BACKGROUND ART

Conventionally, various electric work machines such as electric hydraulic excavators have been proposed. For example, Patent Document 1 discloses an electric hydraulic excavator separately having a fan for cooling a radiator and a fan for cooling an oil cooler.

PRIOR ART DOCUMENT

Patent Document

Patent Document 1: Japanese Unexamined Patent Application Publication No. 2021-80708

SUMMARY OF INVENTION

Technical Problem

For example, in a small-sized electric work machine of backward small-swivel type such as a mini-excavator, a space for arranging each member in an engine room is limited. Therefore, it is usually difficult to individually provide cooling fans corresponding to a radiator and an oil cooler in a small-sized electric work machine as in Patent Document 1. Accordingly, it is desirable to cool the radiator and the oil cooler in a compact layout in a small-sized electric work machine.

The present invention has been made to solve the above-described problem, and an object of the present invention is to provide an electric work machine capable of cooling a radiator (first heat exchanger) and an oil cooler (second heat exchanger) in a compact layout.

Solution to Problem

An electric work machine according to one aspect of the present invention includes a plurality of electric devices, a first heat exchanger that cools a refrigerant passing through at least one of the plurality of electric devices, a hydraulic pump that is driven by any one of the plurality of electric devices and discharges hydraulic oil, a second heat exchanger that cools the hydraulic oil, and a fan that takes outside air into an interior of a machine body, and the first heat exchanger is arranged on an upstream side of the fan in a flow direction of the outside air flown by the fan, and the second heat exchanger is arranged on a downstream side of the fan in the flow direction of the outside air.

Advantageous Effects of Invention

According to the above configuration, the first heat exchanger and the second heat exchanger can be cooled in a compact layout.

DESCRIPTION OF EMBODIMENTS

The following is a description of an embodiment of the present invention based on the drawings.

1. Electric Work Machine

Figure 1:
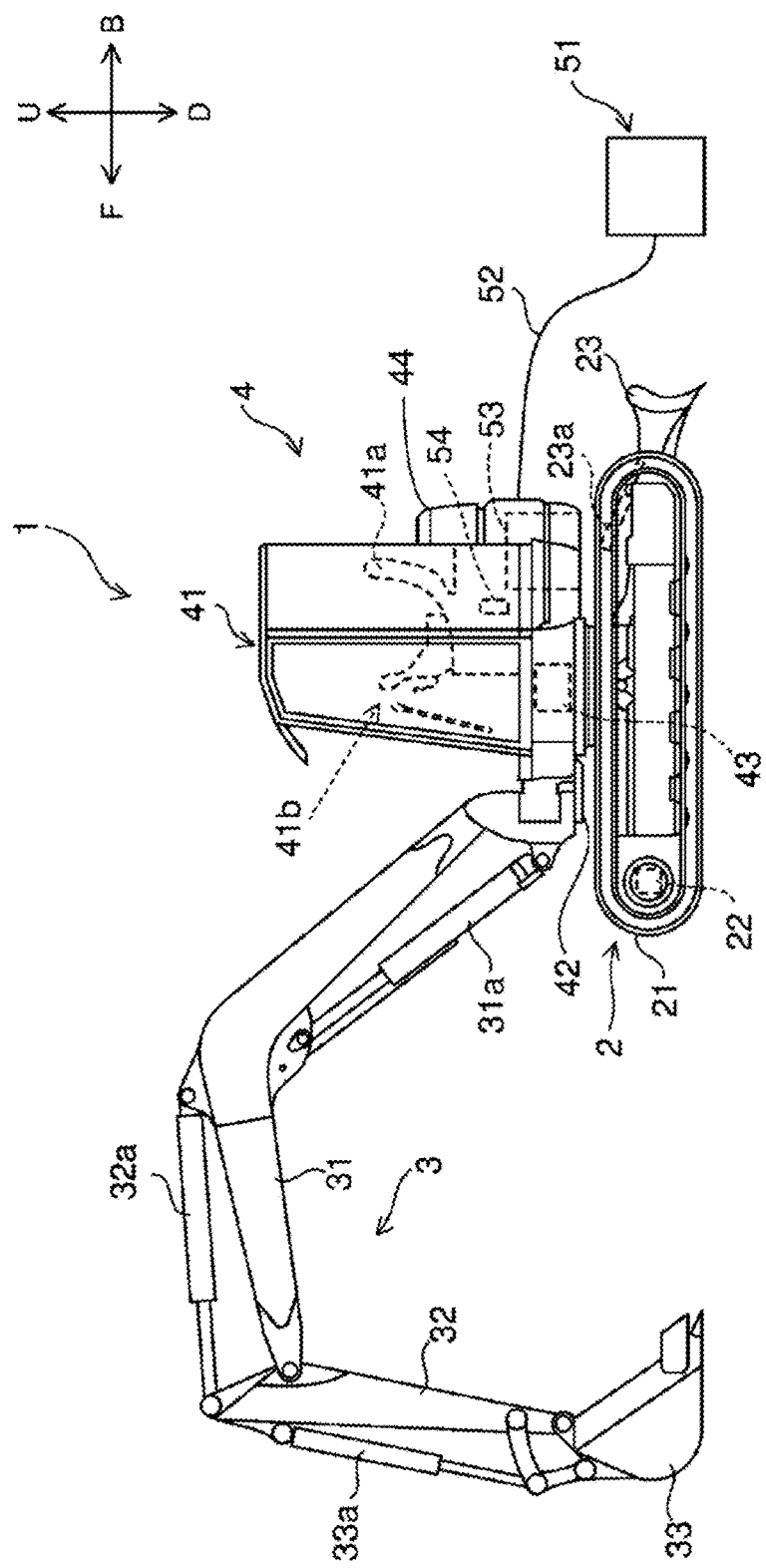
FIG. 1 is a side view illustrating a schematic configuration of a hydraulic excavator provided as an example of an electric work machine according to one embodiment of the present invention.

FIG. 1 is a side view illustrating a schematic configuration of a hydraulic excavator (electric excavator) 1 provided as an example of an electric work machine according to the present embodiment. The hydraulic excavator 1 includes a lower traveling body 2, a work instrument 3, and an upper swivel body 4. In the present embodiment, the hydraulic excavator 1 or the upper swivel body 4 (particularly, an engine room 44) is also referred to as a "machine body".

Here, directions are defined as follows. A forward direction is a direction in which an operator (manipulator, driver) seated on a driver's seat 41a of the upper swivel body 4 faces front, and a backward direction is a direction opposite to the forward direction. Therefore, in a state where the upper swivel body 4 does not swivel with respect to the lower traveling body 2 (0-degree swivel angle), a front-back direction of the upper swivel body 4 coincides with a direction in which the lower traveling body 2 moves forward and backward. As viewed from the operator seated on the driver's seat 41a, a left side is defined as "left" and a right side is defined as "right". A gravity direction perpendicular to the front-back direction and a left-right direction is defined as an up-down direction, in which an upstream side of the gravity direction is defined as "up", and a downstream side thereof is defined as "down". In the drawings, the hydraulic excavator 1 is illustrated in a state where the upper swivel body 4 does not swivel with respect to the lower traveling body 2. In addition, in the drawings, if necessary, forward is denoted by a symbol "F", likewise, backward by "B", rightward by "R", leftward by "L", upward by "U", and downward by "D".

The lower traveling body 2 is provided with a pair of left and right crawlers 21 and a pair of left and right traveling motors 22. Each of the traveling motors 22 is a hydraulic motor. The left and right traveling motors 22 drive the left and right crawlers 21, respectively, thereby allowing the hydraulic excavator 1 to move forward and backward. The lower traveling body 2 is provided with a blade 23 for performing a ground leveling work and a blade cylinder 23a. The blade cylinder 23a is a hydraulic cylinder to rotate the blade 23 in the up-down direction.

The work instrument 3 has a boom 31, an arm 32, and a bucket 33. The boom 31, the arm 32, and the bucket 33 are independently driven, thereby to make it possible to perform excavation work of earth, sand, and the like.

The boom 31 is rotated by a boom cylinder 31a. The boom cylinder 31a has a base end portion thereof supported by a front part of the upper swivel body 4, and is movable freely in an extendable and retractable manner. The arm 32 is rotated by an arm cylinder 32a. The arm cylinder 32a has a base end portion thereof supported by the boom 31, and is movable freely in an extendable and retractable manner. The bucket 33 is rotated by a bucket cylinder 33a. The bucket cylinder 33a has a base end portion thereof supported by the arm 32, and is movable freely in an extendable and retractable manner. The boom cylinder 31a, the arm cylinder 32a, and the bucket cylinder 33a each include a hydraulic cylinder.

The upper swivel body 4 is positioned above the lower traveling body 2, and is so provided as to be swivelable via a swivel bearing (not illustrated) relative to the lower traveling body 2. In the upper swivel body 4, a steering part 41, a swivel frame 42, a swivel motor 43, the engine room 44 and the like are arranged. By driving of the swivel motor 43 that is a hydraulic motor, the upper swivel body 4 swivels via a swivel bearing.

A hydraulic pump 71 (see FIG. 2) is arranged in the upper swivel body 4. The hydraulic pump 71 is driven by an electric motor 61 (see FIG. 2) inside the engine room 44. The hydraulic pump 71 supplies a hydraulic oil (pressure oil) to hydraulic motors (for example, the left and right traveling motors 22 and the swivel motor 43), and hydraulic cylinders (for example, the blade cylinder 23a, the boom cylinder 31a, the arm cylinder 32a, and the bucket cylinder 33a). The hydraulic motors and the hydraulic cylinders that are driven with the hydraulic oil supplied from the hydraulic pump 71 are collectively referred to as hydraulic actuators 73 (see FIG. 2).

The driver's seat 41a is arranged in the steering part 41. Various levers 41b are arranged around the driver's seat 41a. The operator is seated on the driver's seat 41a and operates the levers 41b, thereby driving the hydraulic actuators 73. As a result, traveling of the lower traveling body 2, the ground leveling work by the blade 23, the excavating work by the work instrument 3, the swiveling of the upper swivel body 4 and the like can be performed.

A battery unit 53 is arranged in the upper swivel body 4. The battery unit 53 is composed of, for example, a lithium-ion battery unit, and stores electric power for driving the electric motor 61. The battery unit 53 may be composed of a plurality of batteries as a unit or may be composed of a single battery cell. The upper swivel body 4 has a power feed port which is not illustrated. The power feed port and a commercial power source 51, which is an external power source, are connected via a power feed cable 52. This allows charging of the battery unit 53.

The upper swivel body 4 is further provided with a lead battery 54. The lead battery 54 outputs a low-voltage (12 V, for example) DC voltage. The output from the lead battery 54 is supplied as a control voltage to, for example, a system controller 67 (see FIG. 2), a drive unit of a fan 91 (see FIG. 6), and the like.

The hydraulic excavator 1 may be so configured as to be a combination of hydraulic devices such as the hydraulic actuators 73 and actuators driven by electric power. As the actuators driven by electric power, for example, an electric traveling motor, an electric cylinder, and an electric swivel motor are included.

2. Configuration of Electric System and Hydraulic System

Figure 2:
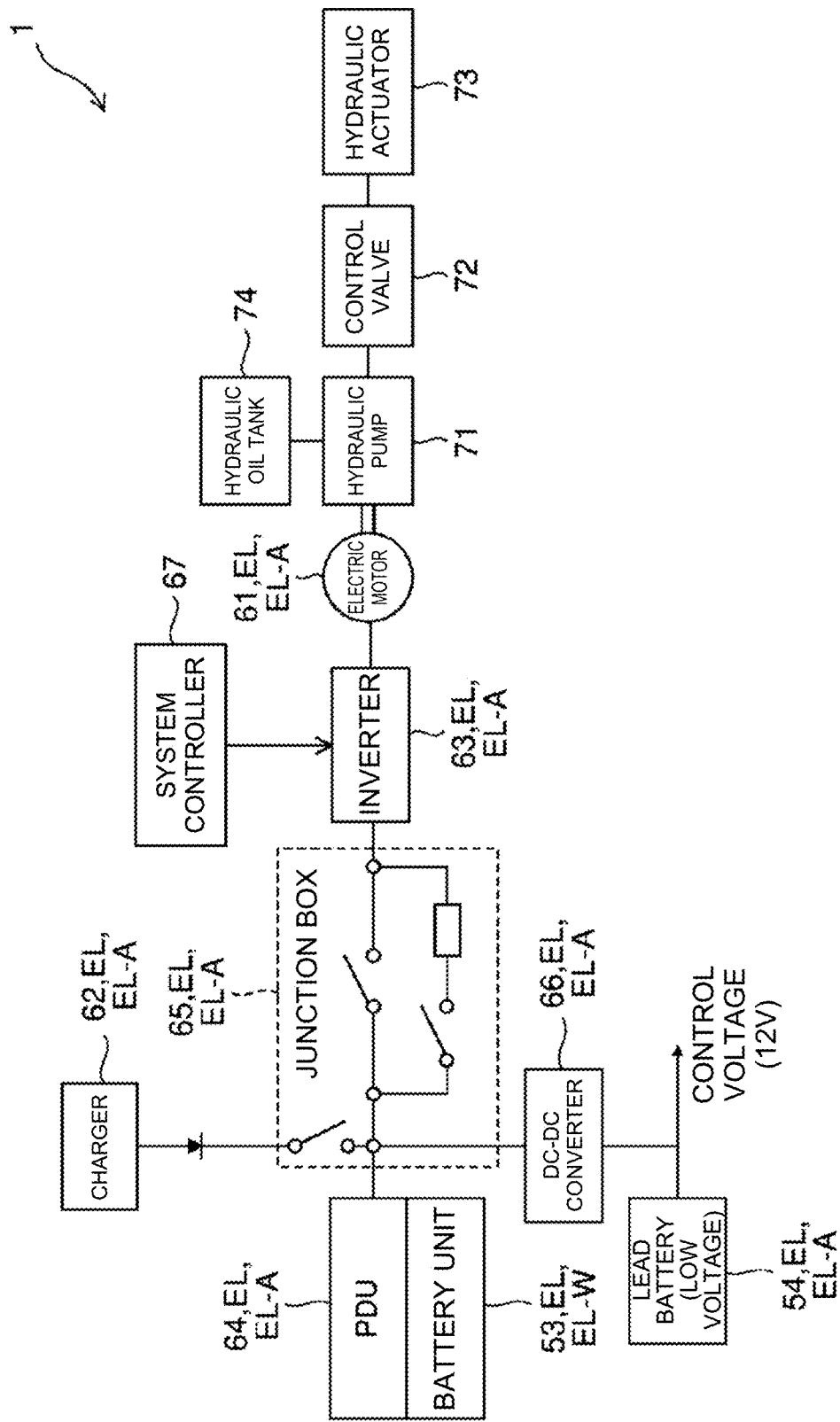
FIG. 2 is a block diagram schematically illustrating a configuration of electric and hydraulic systems of the hydraulic excavator.

FIG. 2 is a block diagram schematically illustrating the configuration of electric and hydraulic systems of the hydraulic excavator 1. The hydraulic excavator 1 includes the electric motor 61, a charger 62, an inverter 63, a power drive unit (PDU) 64, a junction box 65, a DC-DC converter 66, and the system controller 67.

Electric devices EL include the electric motor 61, the charger 62, the inverter 63, the PDU 64, the junction box 65, the DC-DC converter 66, the battery unit 53, and the lead battery 54. That is, the hydraulic excavator 1 includes a plurality of the electric devices EL. The plurality of electric devices EL include a water-cooled electric device EL-W and an air-cooled electric device EL-A, details of which are described below. The system controller 67 is composed of an electronic control unit (ECU) for electrically controlling individual parts of the hydraulic excavator 1.

The electric motor 61 is driven by electric power supplied from the battery unit 53 via the junction box 65 and the inverter 63. The electric motor 61 includes a permanent magnet motor or an induction motor. The electric motor 61 is arranged on the swivel frame 42.

The charger 62 (also referred to as a power feeder) converts an AC voltage supplied from the commercial power source 51, illustrated in FIG. 1, via the power feed cable 52 into a DC voltage. The inverter 63 converts a DC voltage supplied from the battery unit 53 into an AC voltage and supplies the AC voltage to the electric motor 61. Thus, the electric motor 61 is rotated. The AC voltage (current) is supplied from the inverter 63 to the electric motor 61 based on a rotation command output from the system controller 67.

The PDU 64 is a battery control unit that controls an internal battery relay to control inputting and outputting of the battery unit 53. The junction box 65 is so configured as to include a charger relay, an inverter relay, a fuse and the like. The voltage output from the above-mentioned charger 62 is supplied to the battery unit 53 via the junction box 65 and the PDU 64. Further, the voltage output from the battery unit 53 is supplied via the PDU 64 and the junction box 65 to the inverter 63.

The DC-DC converter 66 lowers a high-voltage (300 V, for example) DC voltage supplied from the battery unit 53 via the junction box 65 to a low voltage (12 V, for example). Like the output from the lead battery 54, the voltage output from the DC-DC converter 66 is supplied to the system controller 67, the drive unit of the fan 91, etc.

A plurality of the hydraulic pumps 71 is connected to a rotation axis (output shaft) of the electric motor 61. The plurality of hydraulic pumps 71 include a variable displacement pump and a fixed displacement pump. FIG. 2 illustrates only one hydraulic pump 71 as an example. Each hydraulic pump 71 is connected to a hydraulic oil tank 74 that contains (stores) hydraulic oil. When the hydraulic pump 71 is driven by the electric motor 61, the hydraulic oil in the hydraulic oil tank 74 is supplied to the hydraulic actuator 73 via a control valve 72. Thus, the hydraulic actuator 73 is driven. The control valve 72 is a direction switch valve that controls a flow direction and a flow rate of the hydraulic oil supplied to the hydraulic actuator 73. As described above, the hydraulic excavator 1 includes the hydraulic pump 71 that is driven by any one of the plurality of electric devices EL (for example, the electric motor 61) and discharges the hydraulic oil.

3. Configuration of Interior of Engine Room

Figure 3:
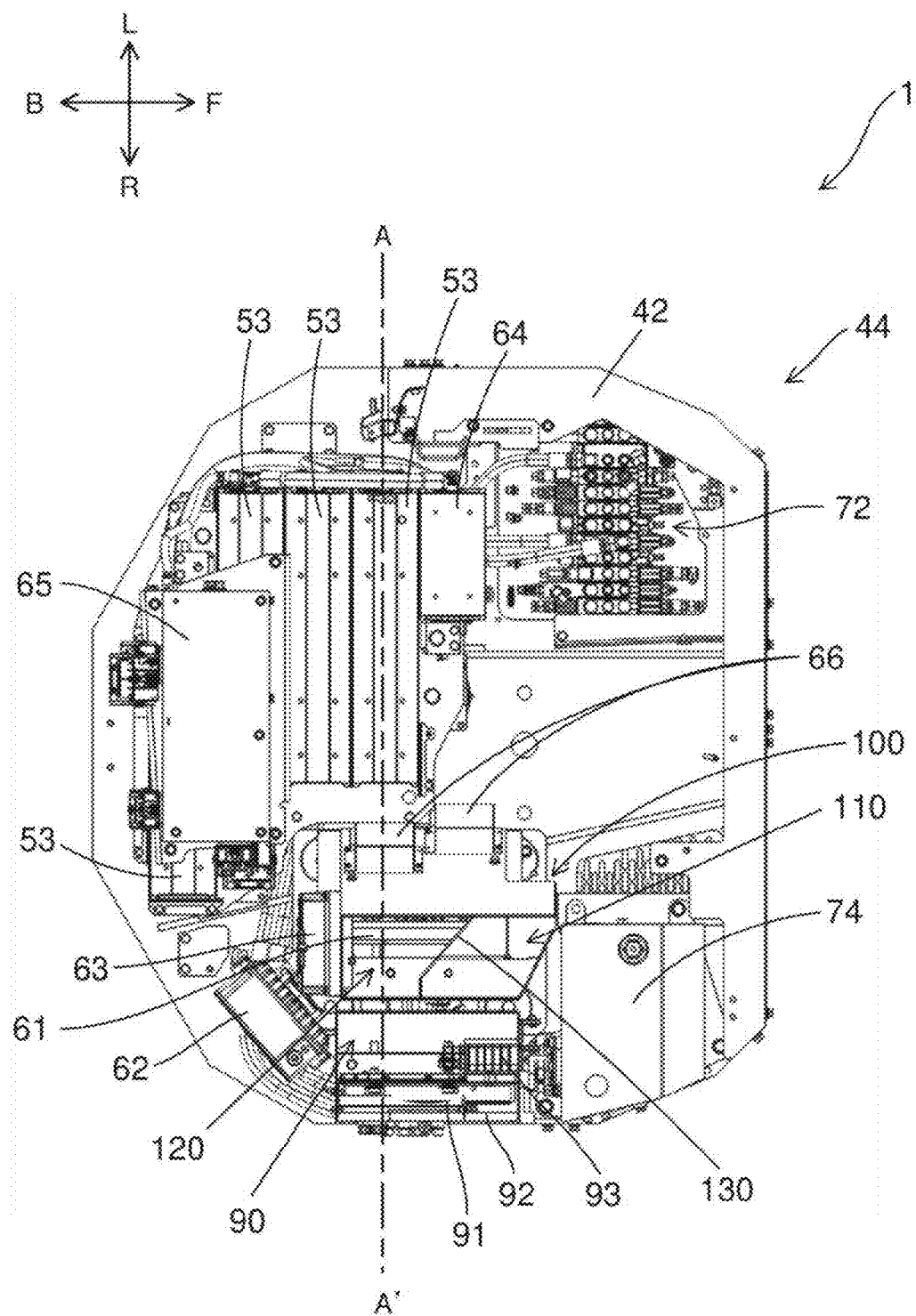
FIG. 3 is a plan view illustrating a configuration of an interior of an engine room of the hydraulic excavator.
Figure 4:
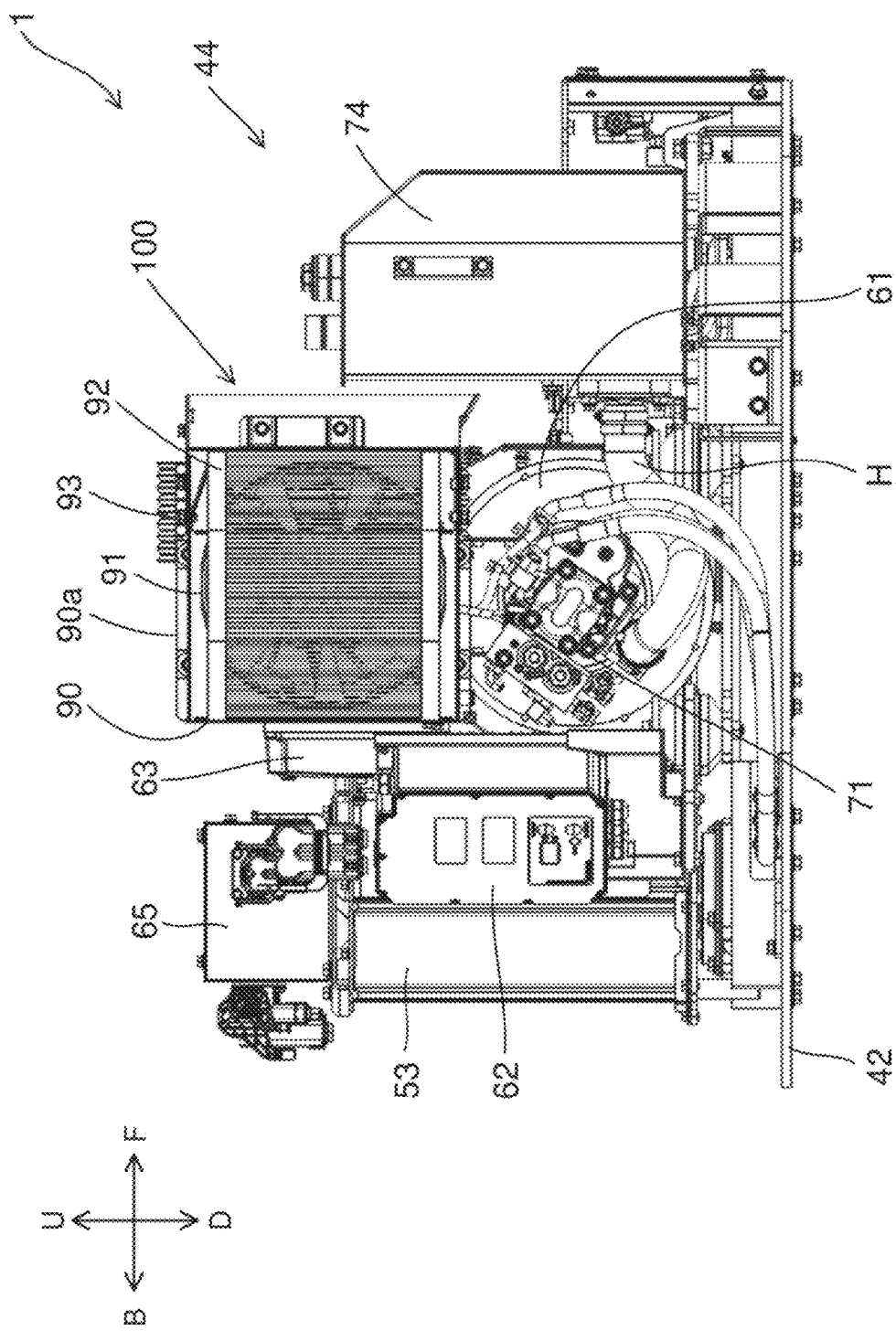
FIG. 4 is a right side view illustrating the configuration of the interior of the engine room.
Figure 5:
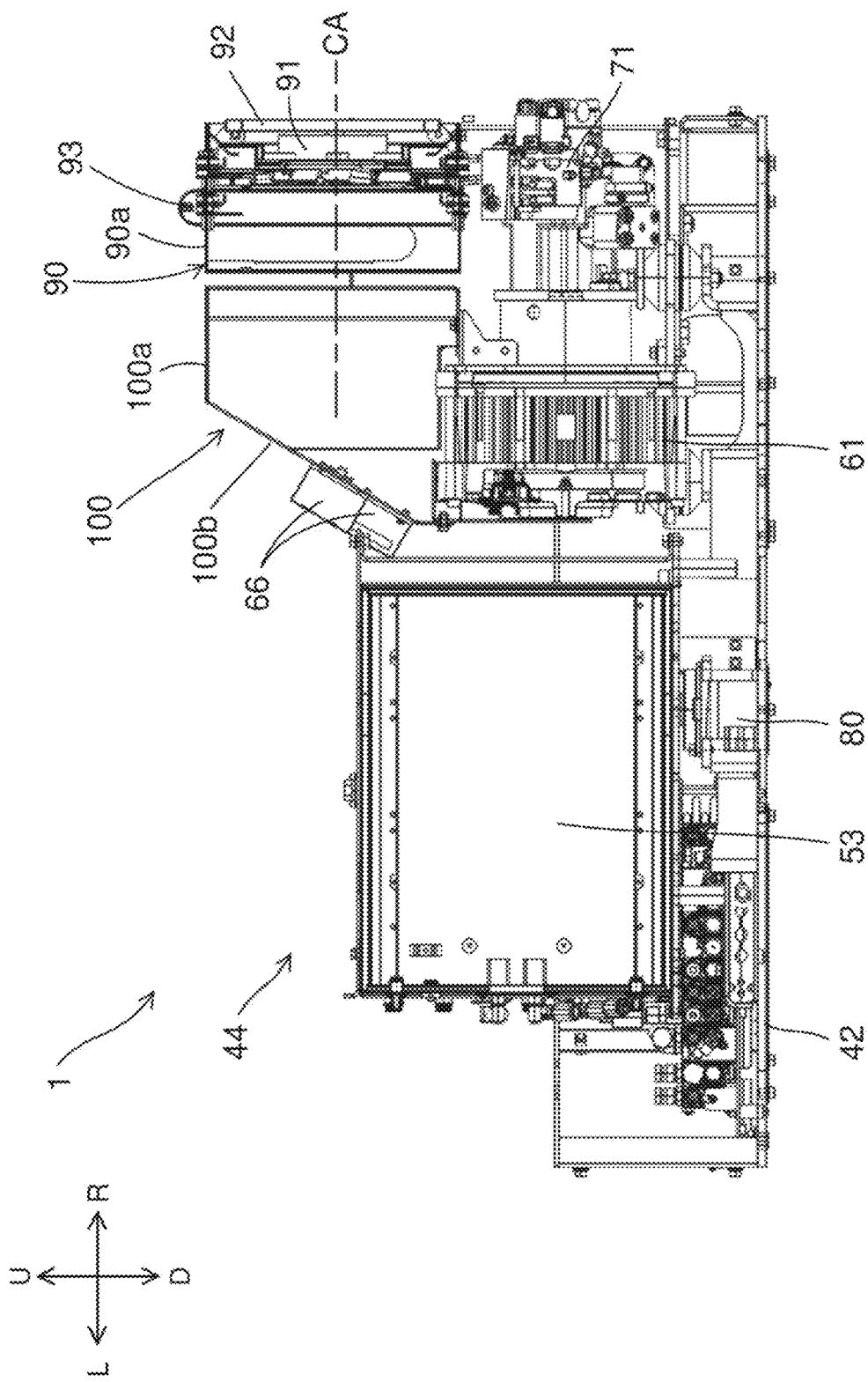
FIG. 5 is a cross-sectional view illustrating the configuration of the interior of the engine room.
Figure 6:
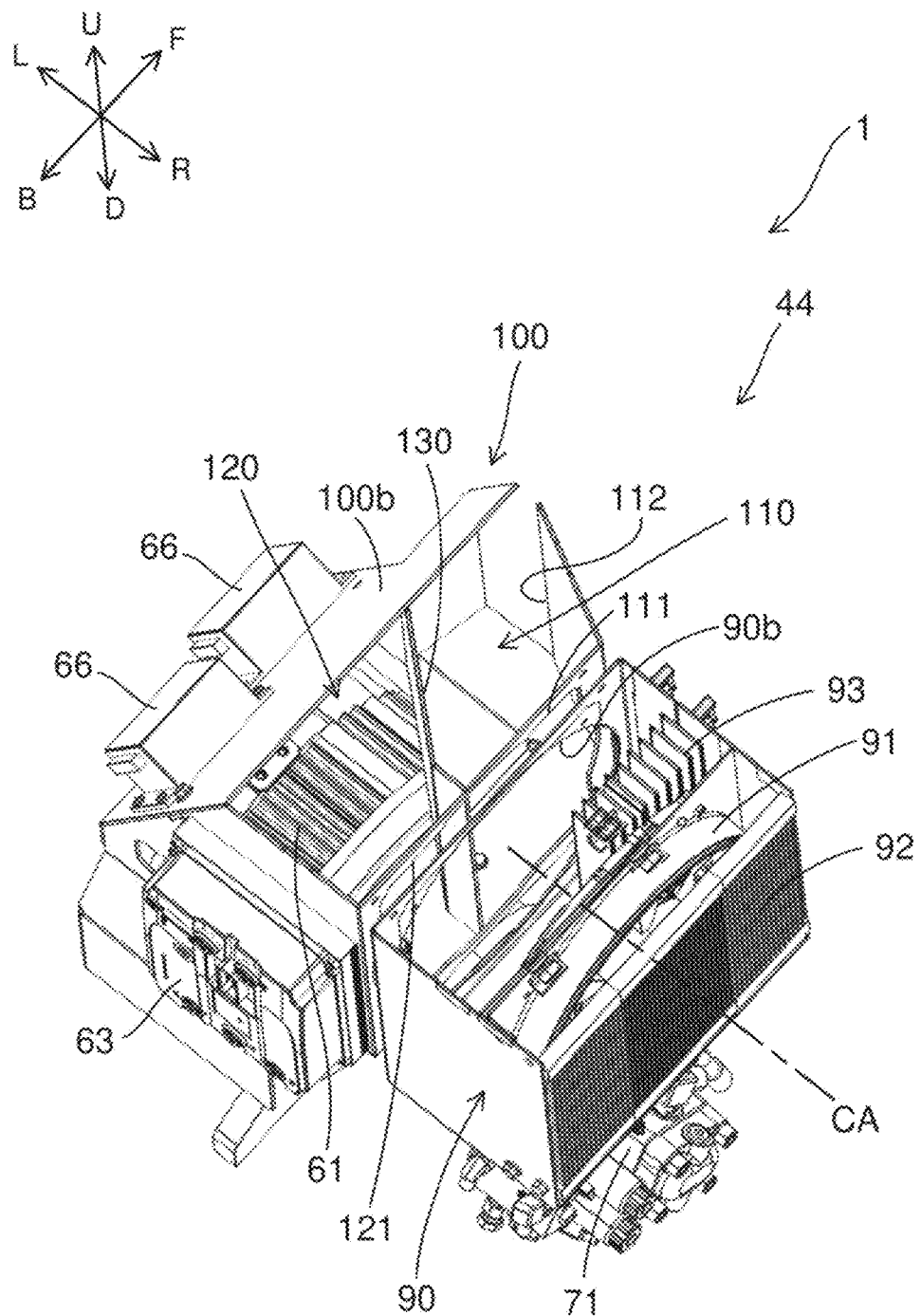
FIG. 6 is an enlarged perspective view illustrating a configuration of a main portion of the interior of the engine room.

FIGS. 3 and 4 are a plan view and a right side view, respectively, illustrating the configuration of the interior of the engine room 44 of the hydraulic excavator 1. FIG. 5 is a cross-sectional view of the interior of the engine room 44 illustrated in FIG. 3 taken along the line A-A' in the up-down direction. FIG. 6 is an enlarged perspective view illustrating a configuration of a main portion of the interior of the engine room 44. In FIGS. 3 and 6, an upper surface 90*a* of a housing 90 (see FIGS. 4 and 5) and an upper surface 100*a* of an air guide portion 100 (see FIG. 5) are not illustrated for a purpose of clarifying a configuration of an interior of the housing 90 and the air guide portion 100.

As illustrated in FIG. 3, in the present embodiment, four battery units 53 are arranged side by side in the front-back direction on the swivel frame 42 via a vibration-proofing member 80 (see FIG. 5) and the like. The battery unit 53 located at the most backward position is positioned at a center in the right-left direction on the swivel frame 42. The remaining three battery units 53 are arranged in such a manner to be shifted in the left direction with respect to the battery unit 53 located at the most backward position. Thus, the plurality of battery units 53 are efficiently arranged in a limited narrow space near a rear end edge of the swivel frame 42 formed in a semicircular shape in a plan view. The number and arrangement of the battery units 53 are not limited to the example of the present embodiment.

As illustrated in FIG. 5, the electric motor 61, the hydraulic pump 71, and the like are arranged on a right side of the plurality of battery units 53 on the swivel frame 42. Hereinafter, the configuration of the interior of the engine room 44 will be described in detail.

As illustrated in FIG. 6, the hydraulic excavator 1 includes the fan 91. The fan 91 is rotatably supported inside the housing 90 and takes outside air into an interior of the machine body by rotation. That is, the fan 91 of the present embodiment is of a suction type. The housing 90 has a frame shape, and both ends in the left-right direction are open. A rotation axis CA of the fan 91 extends in the left-right direction. The hydraulic pump 71 is located below the fan 91 (housing 90). The hydraulic pump 71 is connected to the hydraulic oil tank 74 via a hydraulic hose H (see FIG. 4).

The air guide portion 100 is arranged on a left side of the housing 90, that is, between the housing 90 and the battery units 53 (in particular, the battery unit 53 located at the most forward position). The air guide portion 100 will be described in detail below. The electric devices EL such as the inverter 63 and the DC-DC converter 66 described above are attached to the air guide portion 100 (particularly, a second flow path portion 120 described below).

As illustrated in FIGS. 3 and 4, the charger 62 is arranged on a back side of the fan 91 (housing 90) and the hydraulic pump 71.

The hydraulic excavator 1 further includes a radiator 92 and an oil cooler 93. The radiator 92 is a first heat exchanger that cools a refrigerant passing through at least one of the plurality of electric devices EL (for example, the battery unit 53) illustrated in FIG. 3 and the like. The battery unit 53 can be cooled (water-cooled) by cooling the refrigerant through heat exchange at the radiator 92 and supplying the refrigerant from the radiator 92 to the battery unit 53. The refrigerant is, for example, cooling water.

The oil cooler 93 is a second heat exchanger connected with an oil path circulating via the hydraulic pump 71 and the hydraulic actuator 73 (see FIG. 2), etc. The oil cooler 93 cools, through heat exchange, the hydraulic oil flowing in the oil path by driving of the hydraulic pump 71.

As illustrated in FIG. 6, the radiator 92 is positioned on a right side of the fan 91. That is, the radiator 92 is positioned on an outer side of machine body than the fan 91 in the left-right direction. Since the fan 91 is of a suction type as described above, when the fan 91 is rotated, outside air is sucked into the interior of the machine body from an outside of the machine body. The outside air flows from the right side toward the left side in the interior of the machine body. That is, the outside air flows from the radiator 92 toward the fan 91. From this, it can be said that the radiator 92 is arranged, on an upstream side of the fan 91 in a flow direction of the outside air flown by the fan 91.

On the other hand, the oil cooler 93 is positioned on a left side of the fan 91. That is, the oil cooler 93 is positioned on an inner side of the machine body with respect to the fan 91 in the left-right direction. Therefore, when the fan 91 is rotated, the outside air sucked into the interior of the machine body from the outside of the machine body flows from the right side (radiator 92 side) to the left side (oil cooler 93 side) via the fan 91. Thus, it can be said that the oil cooler 93 is arranged, with respect to the fan 91, on a downstream side in the flow direction of the outside air.

In this way, the radiator 92 and the oil cooler 93 are arranged, with respect to the fan 91, on sides opposite to each other in the left-right direction. Thus, by driving of a single fan 91, the outside air taken into the interior of the machine body from the outside of the machine body hits the radiator 92 and the oil cooler 93 in this order, and both the radiator 92 and the oil cooler 93 can be cooled. Thus, as compared with a configuration in which cooling fans are provided corresponding to the radiator 92 and the oil cooler 93, respectively, a compact layout advantageous for the small-sized hydraulic excavator 1 can be realized. In other words, both the radiator 92 and the oil cooler 93 can be cooled in a compact layout.

In addition, since the outside air hit the radiator 92 can also be hit the oil cooler 93, it can be said that the outside air used for cooling the radiator 92 can be effectively used for cooling the oil cooler 93. Further, since the radiator 92 is arranged on the upstream side in the flow direction of the outside air flown by the fan 91, it is possible to prevent a hand of a person (for example, a maintenance person) as well as foreign matter such as earth and sand from accidentally entering the fan 91 from the outside of the machine body by the radiator 92. Accordingly, it is possible to easily prevent entry of the foreign matter or the like without installing a dedicated member (for example, a mesh-like fence) that blocks the entry of foreign matter or the like.

In the present embodiment, as illustrated in FIGS. 3 and 6, the oil cooler 93 is arranged to face a part of the fan 91 (in a stationary state). That is, in the front-back direction, a length of occupation (width) of the oil cooler 93 is shorter than a length of occupation (width) of the fan 91. Since the fan 91 is of a suction type as described above, when the fan 91 is rotated, a part of the outside air taken into the interior of the machine body flows toward the oil cooler 93, and the rest flows off the oil cooler 93. The high-temperature oil cooler 93 is cooled by the outside air flowing from the fan 91 toward the oil cooler 93. On the other hand, the outside air flowing off the oil cooler 93 from the fan 91 does not hit the high-temperature oil cooler 93, and thus has a relatively low temperature compared to the outside air hitting the oil cooler 93 (the outside air used for cooling the oil cooler 93). From a viewpoint of effectively using the outside air having a relatively low temperature for cooling the electric device EL (for example, the electric motor 61), it is desirable that the oil cooler 93 is arranged to face a part of the fan 91 as in the present embodiment.

Figure 7:
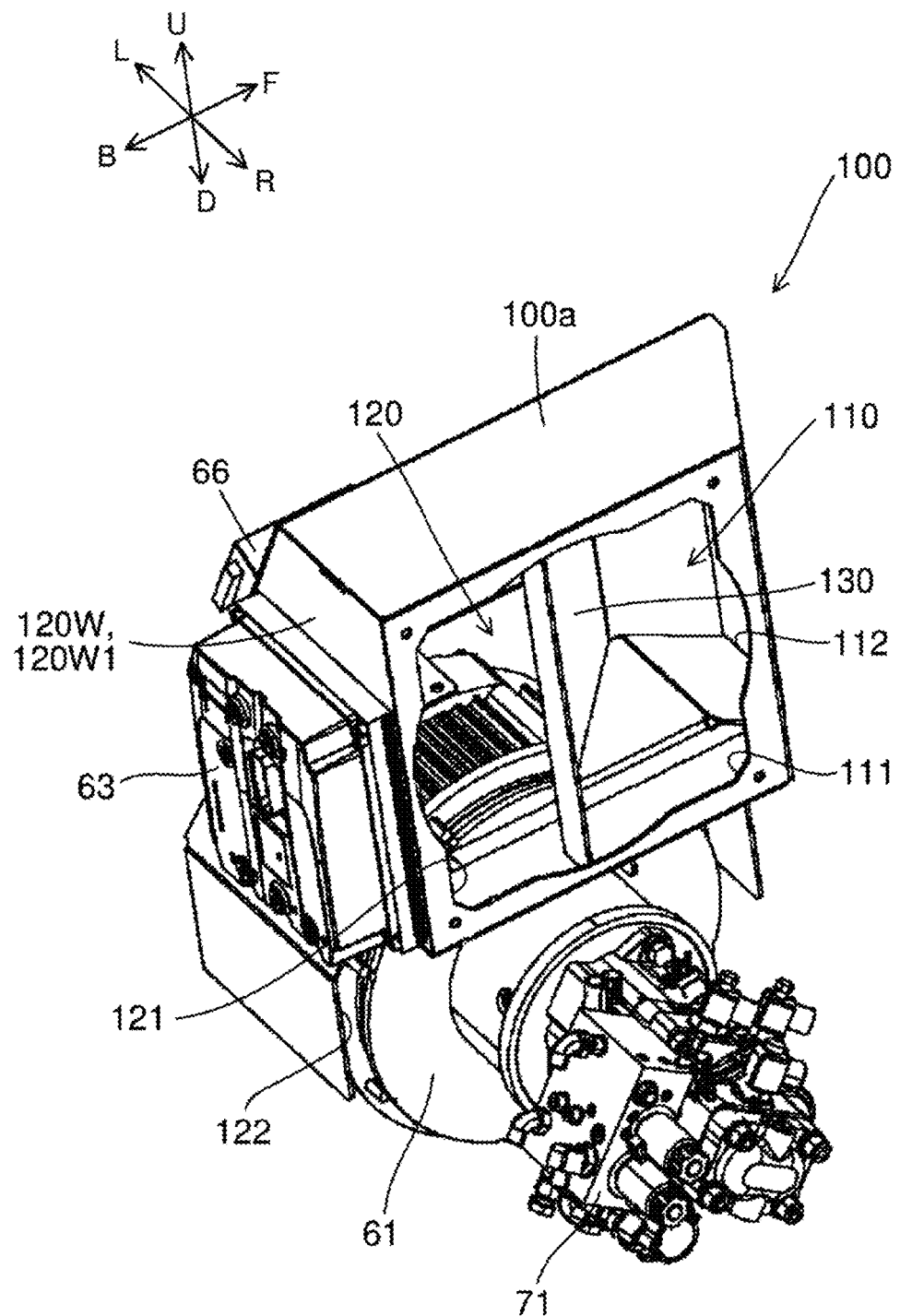
FIG. 7 is a perspective view of an air guide portion provided in the hydraulic excavator.
Figure 8:
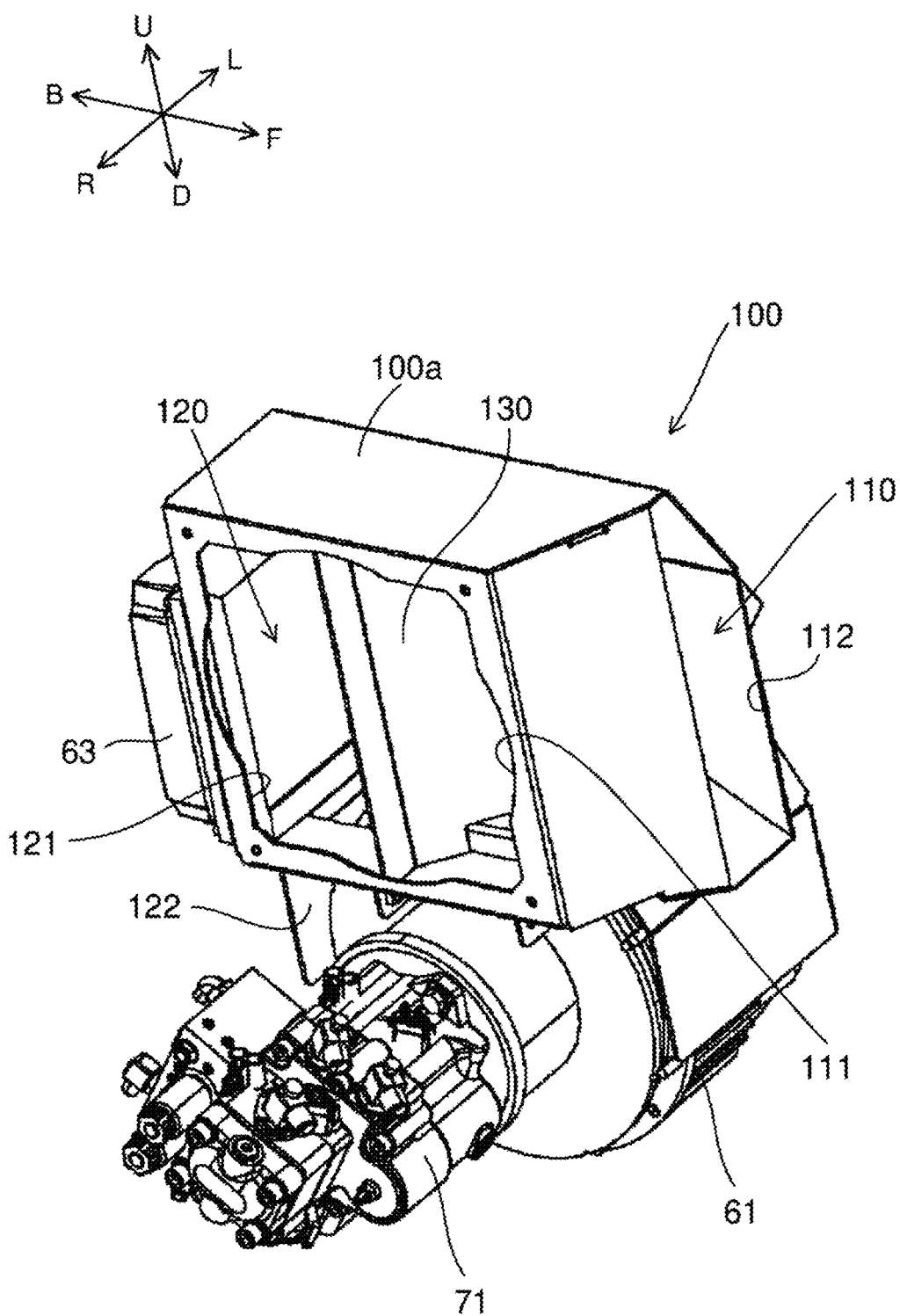
FIG. 8 is a perspective view of the air guide portion.
Figure 9:
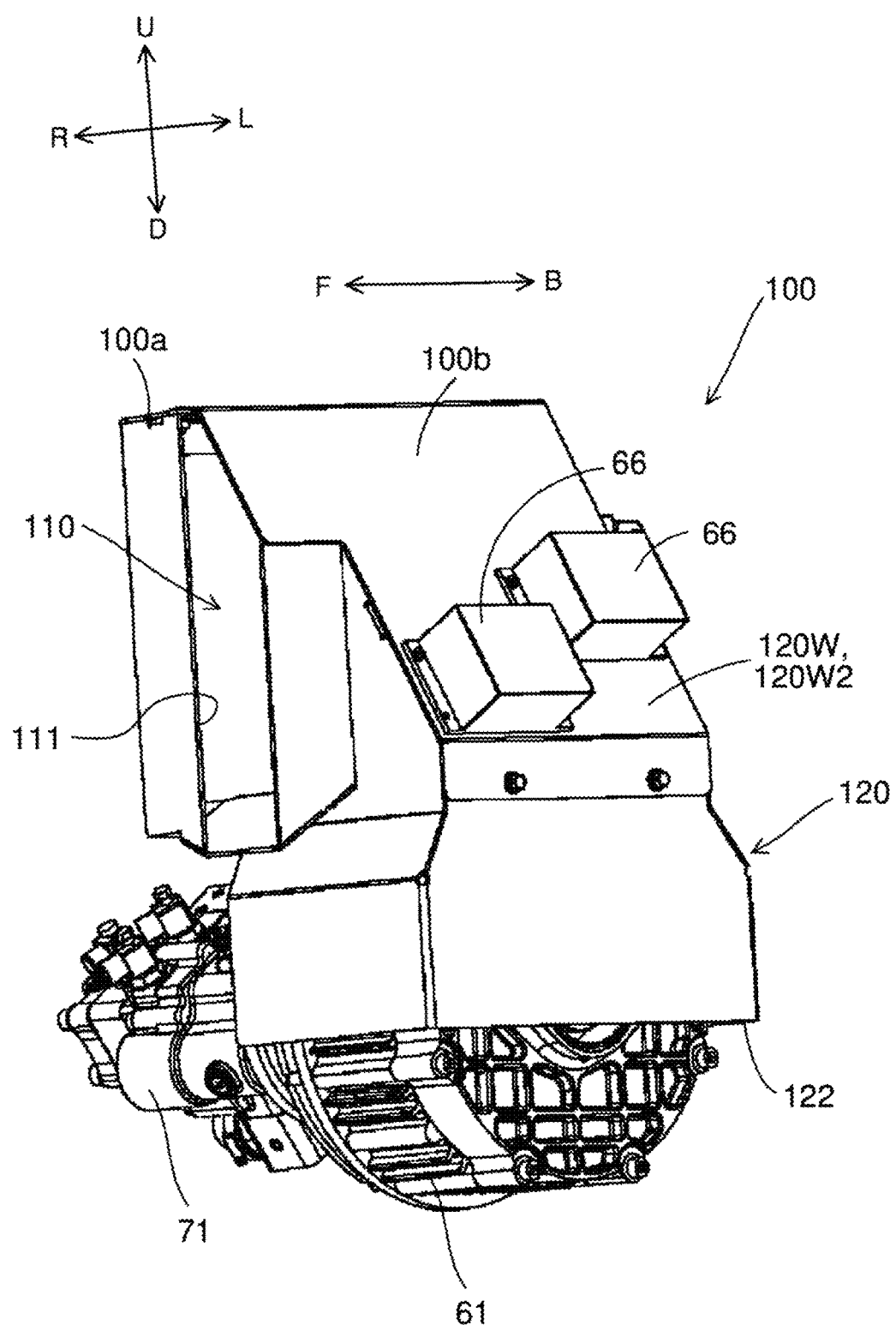
FIG. 9 is a perspective view of the air guide portion.

Next, details of the air guide portion 100 provided in the engine room 44 will be described. FIGS. 7 to 9 are perspective views of the air guide portion 100 as viewed from different directions.

The air guide portion 100 has a first flow path portion 110 and a second flow path portion 120. That is, the hydraulic excavator 1 has the first flow path portion 110 and the second flow path portion 120. The first flow path portion 110 and the second flow path portion 120 are partitioned by a partition plate 130. In other words, the first flow path portion 110 and the second flow path portion 120 share the partition plate 130.

As illustrated in FIG. 6, the air guide portion 100 is arranged on the left side with respect to the housing 90 having the fan 91 and the like, that is, on the inner side of the machine body. Therefore, the outside air that has passed through the interior of the housing 90 by the fan 91 passes through an exit-side opening portion 90b of the housing 90, is guided to the air guide portion 100, and flows through an interior of any one of the first flow path portion 110 and the second flow path portion 120 of the air guide portion 100.

The first flow path portion 110 has a first opening portion 111 at an upstream end portion in the flow direction of the outside air and a second opening portion 112 at a downstream end portion in the flow direction of the outside air. That is, the first flow path portion 110 has the first opening portion 111 at one end portion and the second opening portion 112 at the other end portion. The first opening portion 111 is positioned on a side opposite to the oil cooler 93 with respect to the exit-side opening portion 90b of the housing 90, and opens toward the right side in the left-right direction. In the first flow path portion 110, the flow path is bent from the left-right direction to the front-back direction by the partition plate 130. As a result, the second opening portion 112 of the first flow path portion 110 opens toward the front in the front-back direction (see FIGS. 6, 8, and 9). The shape of first flow path portion 110 is not limited to the bent shape described above.

In this configuration, by the fan 91, the outside air flowing toward the oil cooler 93 in the housing 90 hits the oil cooler 93 to cool the oil cooler 93, and then becomes a relatively high-temperature wind to flow into an interior of the first flow path portion 110 via the first opening portion 111. Then, the relatively high-temperature wind flowing through the interior of the first flow path portion 110 is discharged through the second opening portion 112. Therefore, in view of smoothly discharging the relatively high-temperature air after cooling the oil cooler 93 to the outside of the machine body via the second opening portion 112, as illustrated in FIG. 6, it is desirable that the first opening portion 111 be positioned on a side opposite to the fan 91 with respect to the oil cooler 93.

The second flow path portion 120 has a third opening portion 121 at the upstream end portion in the flow direction of the outside air and a fourth opening portion 122 at the downstream end portion in the flow direction of the outside air. That is, the second flow path portion 120 has the third opening portion 121 at one end portion and the fourth opening portion 122 at the other end portion. The third opening portion 121 is positioned on a side opposite to the fan 91 with respect to the exit-side opening portion 90b of the housing 90, and opens toward the right side in the left-right direction. In the second flow path portion 120, the flow path is bent from the right-left direction to the up-down direction by an inclined surface 100b which is inclined downward from a left end portion of the upper surface 100a toward the inner side of the machine body (the left side in the right-left direction). As a result, the fourth opening portion 122 of the second flow path portion 120 opens downward. The shape of second flow path portion 120 is not limited to the bent shape described above.

In addition, the third opening portion 121 of the second flow path portion 120 is positioned side by side with the first opening portion 111 of the first flow path portion 110 (in the F-B direction in FIG. 7 and the like) when viewed from the direction of the rotation axis CA of the fan 91, and is connected to the first opening portion 111. Accordingly, one large opening portion is formed on the housing 90 side of the air guide portion 100. Further, as illustrated in FIG. 6, the third opening portion 121 is positioned so as to be shifted from the oil cooler 93 (in the F-B direction) when viewed from the direction of the rotation axis CA of the fan 91. Therefore, the third opening portion 121 does not overlap with the oil cooler 93 when viewed from the direction of the rotation axis CA of the fan 91.

With this configuration, out of the outside air taken into the interior of the housing 90 via the radiator 92 by the fan 91, the outside air flowing off the oil cooler 93 is guided into an interior of the second flow path portion 120 via the third opening portion 121. Then, the outside air flowing through the interior of the second flow path portion 120 is discharged from the fourth opening portion 122. Since the outside air flowing off the oil cooler 93 does not hit the high-temperature oil cooler 93, the outside air has a relatively low temperature compared to the outside air hitting the oil cooler 93 (the outside air used for cooling the oil cooler 93). From a viewpoint of effectively using the outside air having a relatively low temperature for cooling the electric device EL (for example, the electric motor 61), it is desirable that the third opening portion 121 serving as an inlet for guiding the outside air having a relatively low temperature to the interior of the second flow path portion 120 is positioned to be shifted from the oil cooler 93 when viewed from the direction of the rotation axis CA of the fan 91 as in the present embodiment.

As illustrated in FIG. 2, the plurality of electric devices EL included in the hydraulic excavator 1 include the water-cooled device EL-W through which the above-described refrigerant passes and the air-cooled device EL-A. The water-cooled device EL-W is, for example, the battery unit 53. That is, the plurality of electric devices EL include the battery unit 53 through which the refrigerant passes.

The air-cooled devices EL-A include, for example, the electric motor 61, the charger 62, the inverter 63, the PDU 64, the junction box 65, the DC-DC converter 66, and the lead battery 54. That is, the plurality of air-cooled devices EL-A include the electric motor 61 that drives the hydraulic pump 71.

The air-cooled device EL-A can be efficiently cooled (air-cooled) if the air-cooled device EL-A can be directly hit by a relatively low-temperature wind that flows off the oil cooler 93 (through the outside of the oil cooler 93) after cooling the radiator 92 by the fan 91, enters the interior of the second flow path portion 120 from the third opening portion 121, and is discharged from the fourth opening portion 122. Therefore, from the viewpoint of improving the cooling efficiency of the air-cooled device EL-A, it is desirable that any one of the plurality of air-cooled devices EL-A is arranged at the fourth opening portion 122 of the second flow path portion 120.

In the present embodiment, the electric motor 61, which is the air-cooled device EL-A, is arranged at the fourth opening portion 122. In this case, since the relatively low-temperature wind discharged from the fourth opening portion 122 directly hits the electric motor 61, the cooling efficiency of the electric motor 61 is improved.

In addition, from the viewpoint of realizing a compact layout by fitting the air-cooled device EL-A (for example, the electric motor 61) from downward to the fourth opening portion 122 of the second flow path portion 120, it is desirable that the fourth opening portion 122 opens downward as in the present embodiment.

From the viewpoint of efficiently cooling the other air-cooled devices EL-A (other than the electric motor 61) by the relatively low-temperature wind flowing through the interior of the second flow path portion 120, it is desirable that any another one of the plurality of air-cooled devices EL-A is arranged on a wall surface 120W (see FIGS. 7 and 9) of the second flow path portion 120.

In the present embodiment, the inverter 63 is arranged on a side surface 120W1 (see FIG. 7) on the back side in the front-back direction of the second flow path portion 120. The DC-DC converter 66 is arranged on a back surface 120W2 (see FIG. 9), which constitutes the second flow path portion 120, of the inclined surface 100b of the air guide portion 100. In this case, the relatively low-temperature wind flows through the interior of the second flow path portion 120, whereby the inverter 63, which is the air-cooled device EL-A arranged on the side surface 120W1, is efficiently cooled, and the DC-DC converter 66, which is the air-cooled device EL-A arranged on the back surface 120W2, is efficiently cooled.

The air-cooled devices EL-A arranged on the wall surface 120W of the second flow path portion 120 may include a heat dissipation portion such as fins. In addition, the heat dissipation portion may be positioned protruding into the interior of the second flow path portion 120. In this case, the relatively low-temperature wind flowing through the interior of the second flow path portion 120 hits the heat dissipation portion, thereby further improving the cooling efficiency of the air-cooled device EL-A arranged on the wall surface 120W.

From the viewpoint of cooling the other air-cooled devices EL-A by using the relatively low-temperature wind discharged from the fourth opening portion 122 of the second flow path portion 120, any another one of the plurality of air-cooled devices EL-A may be arranged outside the second flow path portion 120.

In the present embodiment, as illustrated in FIG. 3, other air-cooled devices EL-A such as the charger 62 and the junction box 65 are arranged outside the second flow path portion 120. In this case, the relatively low-temperature wind discharged from the fourth opening portion 122 of the second flow path portion 120 hits the charger 62 and the like around the second flow path portion 120, thereby cooling the charger 62 and the like. That is, the relatively low-temperature wind discharged from the fourth opening portion 122 is effectively used to cool the charger 62 and the like.

From the viewpoint of effectively utilizing a narrow (limited) space in the engine room 44 while individually cooling the electric motor 61, which is the air-cooled device EL-A, and the battery unit 53, which is the water-cooled device EL-W, it is desirable that the electric motor 61 be arranged near the water-cooled device EL-W in the engine room 44. In this regard, it is desirable that the electric motor 61 be arranged side by side with the water-cooled device EL-W.

In addition, from the viewpoint of effectively utilizing the narrow (limited) space in the engine room 44 while separately cooling the water-cooled device EL-W and the plurality of air-cooled devices EL-A, it is desirable that the battery unit 53 which is the water-cooled device EL-W be arranged near the second flow path portion 120 (in which the plurality of air-cooled devices EL-A are arranged on the wall surface 120W) in the engine room 44. In this regard, as illustrated in FIG. 5, it is desirable that the battery unit 53 is arranged side by side with the second flow path portion 120.

4. Supplementary Description

In the present embodiment, as illustrated in FIG. 6, the example in which the oil cooler 93 is arranged so as to overlap a part of the radiator 92 when viewed from the direction of the rotation axis CA of the fan 91 has been described, but the oil cooler 93 may be arranged so as not to overlap the radiator 92. For example, as viewed from the direction of the rotation axis CA, the radiator 92 may be arranged so as to overlap with the left half of the fan 91, and the oil cooler 93 may be arranged so as to overlap with the right half of the fan 91. Even in this case, there is no change in the fact that both the radiator 92 and the oil cooler 93 can be cooled by the driving of the single fan 91, and the radiator 92 and the oil cooler 93 can be cooled in a compact layout.

The hydraulic excavator 1 which is the construction machine has been described heretofore as the example of the electric work machine, but the electric work machine is not limited to the hydraulic excavator 1 and may be any other construction machine such as a wheel loader. The electric work machine may be an agricultural machine such as a combine harvester or a tractor.

5. Supplementary Notes

The hydraulic excavator 1 described in the present embodiment can also be referred to as an electric work machine as illustrated in the following Supplementary Notes.

An electric work machine of Supplementary Note (1) comprising:
   a plurality of electric devices;
   a first heat exchanger that cools a refrigerant passing through at least one of the plurality of electric devices;
   a hydraulic pump that is driven by any one of the plurality of electric devices and discharges hydraulic oil;
   a second heat exchanger that cools the hydraulic oil; and
   a fan that takes outside air into an interior of a machine body,
   wherein
   the first heat exchanger is arranged on an upstream side of the fan in a flow direction of the outside air flown by the fan, and the second heat exchanger is arranged on a downstream side of the fan in the flow direction of the outside air.

The electric work machine of Supplementary Note (2) is the electric work machine according to Supplementary Note (1), wherein the second heat exchanger is arranged to face a part of the fan.

The electric work machine of Supplementary Note (3) is the electric work machine according to Supplementary Note (2), further comprising:

a first flow path portion that has a first opening portion at one end portion and a second opening portion at another end portion, wherein the first opening portion of the first flow path portion is positioned on a side opposite to the fan with respect to the second heat exchanger.

The electric work machine of Supplementary Note (4) is the electric work machine according to Supplementary Note (3), further comprising:

a second flow path portion that has a third opening portion at one end portion and a fourth opening portion at another end portion, wherein, when viewed from a rotation axis direction of the fan, the third opening portion of the second flow path portion is positioned side by side with the first opening portion of the first flow path portion and is positioned to be shifted from the second heat exchanger.

The electric work machine of Supplementary Note (5) is the electric work machine according to Supplementary Note (4), wherein the plurality of electric devices include a water-cooled device through which the refrigerant passes and a plurality of air-cooled devices, and any one of the plurality of air-cooled devices is arranged at the fourth opening portion of the second flow path portion.

The electric work machine of Supplementary Note (6) is the electric work machine according to Supplementary Note (5), wherein any another one of the plurality of air-cooled devices is arranged on a wall surface of the second flow path portion.

The electric work machine of Supplementary Note (7) is the electric work machine according to Supplementary Note (5) or Note (6), wherein any another one of the plurality of air-cooled devices is arranged outside the second flow path portion.

The electric work machine of Supplementary Note (8) is the electric work machine according to any one of Supplementary Notes (5) to (7), wherein the fourth opening portion opens downward.

The electric work machine of Supplementary Note (9) is the electric work machine according to any one of Supplementary Notes (5) to (8), wherein the plurality of air-cooled devices include an electric motor that drives the hydraulic pump, and the electric motor is arranged side by side with the water-cooled device.

The electric work machine of Supplementary Note (10) is the electric work machine according to any one of Supplementary Notes (4) to (9), wherein the plurality of electric devices include a battery unit through which the refrigerant passes, and the battery unit is arranged side by side with the second flow path portion.

The embodiments of the present invention have been described above, but the scope of the present invention is not limited thereto, and can be carried out within an extended or modified range without departing from the gist of the present invention.

INDUSTRIAL APPLICABILITY

The present invention is applicable to a work machine such as a construction machine and an agricultural machine, for example.

REFERENCE SIGNS LIST

1 Hydraulic excavator (electric work machine)
44 Engine room (machine body)
53 Battery unit (electric device, water-cooled device)
54 Lead battery (electric device, air-cooled device)
61 Electric motor (electric device, air-cooled device)
62 Charger (electric device, air-cooled device)
63 Inverter (electric device, air-cooled device)
65 Junction box (electric device, air-cooled device)
66 DC-DC converter (electric device, air-cooled device)
71 Hydraulic pump
91 Fan
92 Radiator (first heat exchanger)
93 Oil cooler (second heat exchanger)
110 First flow path portion
111 First opening portion
112 Second opening portion
120 Second flow path portion
120W Wall Surface
120W1 Side surface (wall surface)
120W2 Back surface (wall surface)
121 Third opening portion
122 Fourth opening portion
CA Rotation axis
EL Electric device
EL-W Water-cooled device
EL-A Air-cooled device

The invention claimed is:

1. An electric work machine comprising:
a plurality of electric devices;
a first heat exchanger that cools a refrigerant passing through at least one of the plurality of electric devices;
a hydraulic pump that is driven by any one of the plurality of electric devices and discharges hydraulic oil;
a second heat exchanger that cools the hydraulic oil; and
a fan that takes outside air into an interior of a machine body, wherein
the first heat exchanger is arranged on an upstream side of the fan in a flow direction of the outside air flown by the fan, and
the second heat exchanger is arranged on a downstream side of the fan in the flow direction of the outside air.

2. The electric work machine according to claim 1, wherein the second heat exchanger is arranged to face a part of the fan.

3. The electric work machine according to claim 2, further comprising:
a first flow path portion that has a first opening portion at one end portion and a second opening portion at another end portion,
wherein the first opening portion of the first flow path portion is positioned on a side opposite to the fan with respect to the second heat exchanger.

4. The electric work machine according to claim 3, further comprising:
a second flow path portion that has a third opening portion at one end portion and a fourth opening portion at another end portion,
wherein, when viewed from a rotation axis direction of the fan, the third opening portion of the second flow path portion is positioned side by side with the first opening portion of the first flow path portion and is positioned to be shifted from the second heat exchanger.

5. The electric work machine according to claim 4, wherein the plurality of electric devices include a water-cooled device through which the refrigerant passes and a plurality of air-cooled devices, and any one of the plurality of air-cooled devices is arranged at the fourth opening portion of the second flow path portion.

6. The electric work machine according to claim 5, wherein any another one of the plurality of air-cooled devices is arranged on a wall surface of the second flow path portion.

7. The electric work machine according to claim 5, wherein any another one of the plurality of air-cooled devices is arranged outside the second flow path portion.

8. The electric work machine according to claim 5, wherein the fourth opening portion opens downward.

9. The electric work machine according to claim 5, wherein the plurality of air-cooled devices include an electric motor that drives the hydraulic pump, and the electric motor is arranged side by side with the water-cooled device.

10. The electric work machine according to claim 4, wherein the plurality of electric devices include a battery unit through which the refrigerant passes, and the battery unit is arranged side by side with the second flow path portion.

* * * * *